Dec. 23, 1941.   F. STEBLER   2,267,429
SILENT WATER ELIMINATOR
Original Filed Jan. 9, 1939   2 Sheets-Sheet 1
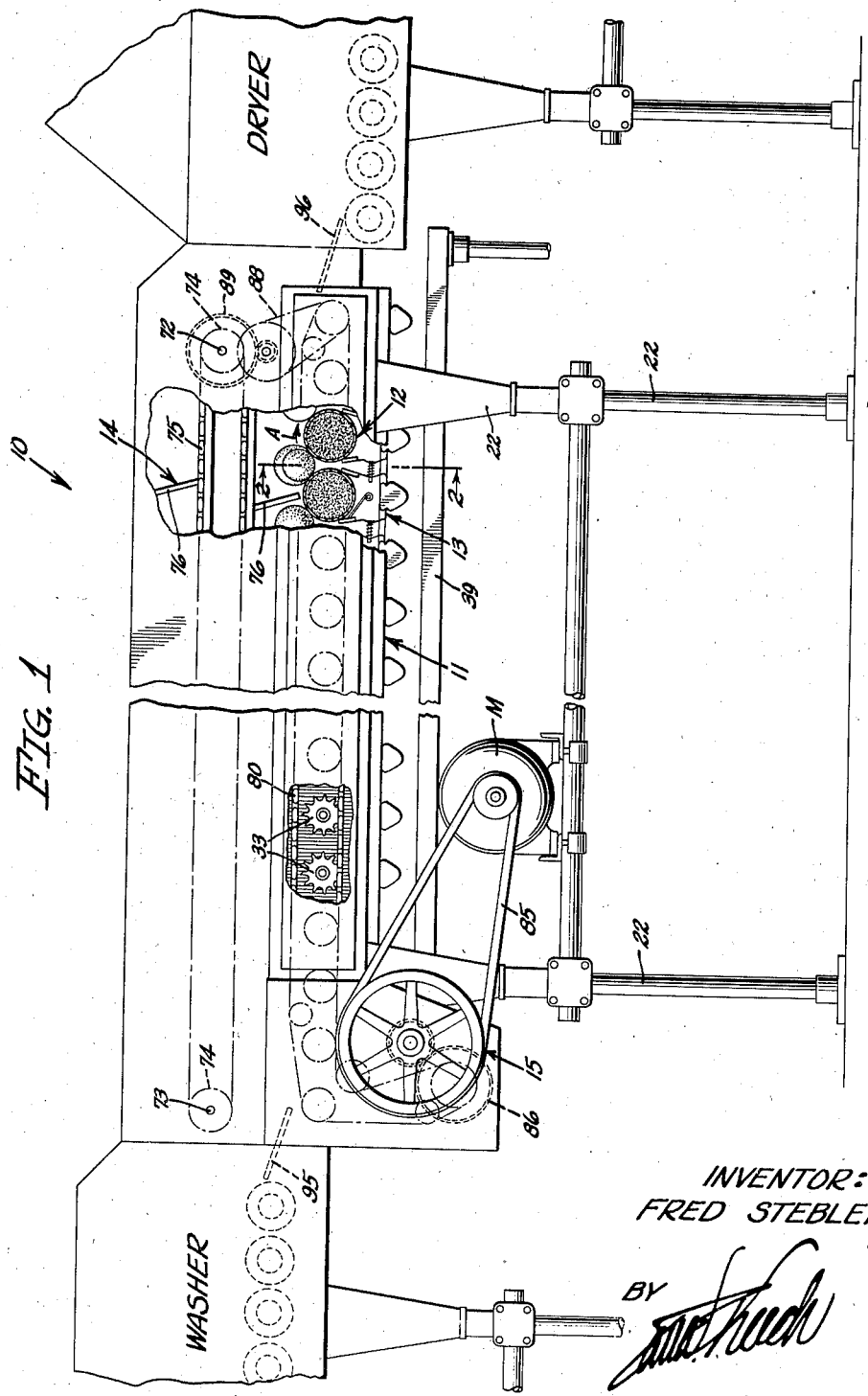
INVENTOR:
FRED STEBLER
BY 
ATTORNEY Dec. 23, 1941.                F. STEBLER                2,267,429
                          SILENT WATER ELIMINATOR
              Original Filed Jan. 9, 1939        2 Sheets-Sheet 2
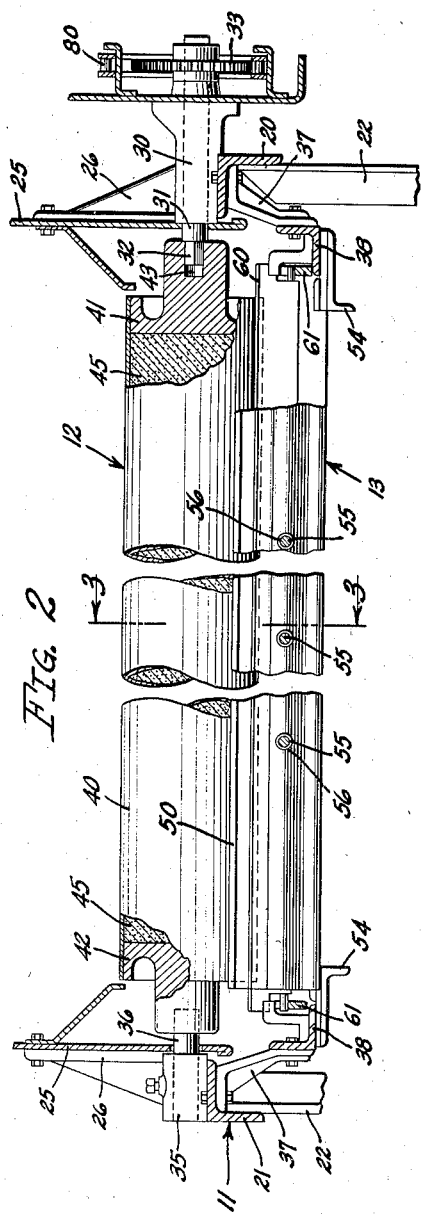
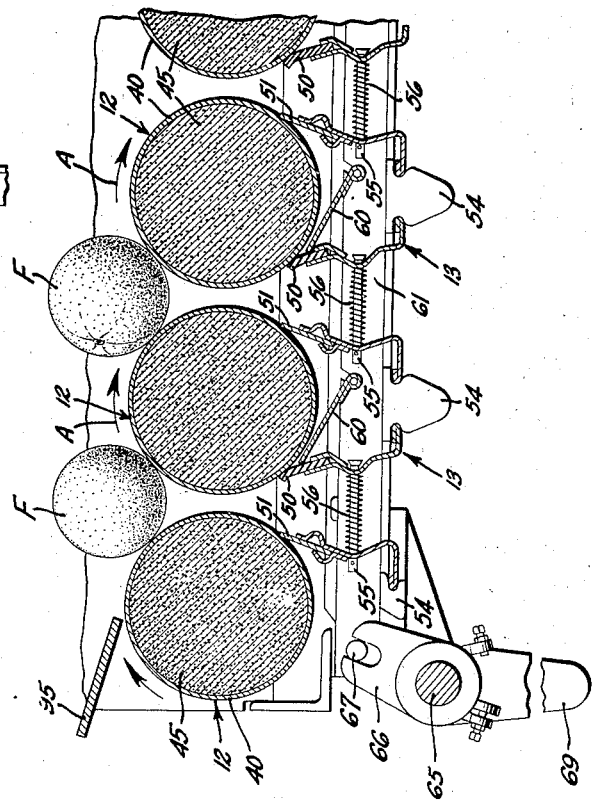
INVENTOR:
FRED STEBLER
BY
ATTORNEY Patented Dec. 23, 1941

2,267,429

UNITED STATES PATENT OFFICE 2,267,429

SILENT WATER ELIMINATOR

Fred Stebler, Riverside, Calif., assignor to Food Machinery Corporation, San Jose, Calif., a corporation of Delaware Original application January 9, 1939, Serial No. 249,858. Divided and this application April 8, 1940, Serial No. 328,504

1 Claim. (Cl. 34—240)

My invention relates to fruit treating machines and particularly to an improvement in water eliminators. This invention is particularly useful in water eliminators of the type shown in United States Patents No. 1,957,964, issued May 8, 1934, to Lloyd E. Jones, and No. 1,974,128, issued September 18, 1934, to Albert R. Thompson.

The structure included in this application is divided out of my co-pending application, Serial No. 249,858, filed January 9, 1939, for Water eliminator.

In the preparation of citrus and similar fruits for market, the fruit is usually washed, dried and otherwise processed before being packed for shipment. After washing, and prior to the final drying operation, the fruit is often passed through a water eliminator for rapidly removing the bulk of the water from the fruit to facilitate the final drying operation.

The type of water eliminator to which the present invention relates includes a series of hollow metal rolls arranged in side-by-side relation and driven in a common direction of rotation. The fruit bodies, after being washed and rinsed, are delivered onto the upper surfaces of these rolls where the fruit bodies are rotated by contact with the revolving rolls. This contact causes water to be transferred from the fruit onto the surfaces of the rolls. The moisture is in turn removed from the rolls by means of rubber squeegees mounted in wiping relation with the underside of the rolls.

The rolls used in these eliminators tend to accumulate solid matter which adheres to the surface of the rolls and impairs the effectiveness of these in the moisture-removing operation. To overcome this, scrapers are mounted to contact the rolls which keep the surfaces of the rolls smooth.

Although such water eliminators perform their function in a highly efficient and satisfactory manner, the noise resulting from the frictional contact between the rotating rolls and the squeegees and scrapers is highly objectionable.

The squeegees or the scrapers, or both, cause the walls of the rolls to vibrate at a high frequency resulting in a continuous, piercing screech, particularly when the rolls are relatively dry as at the discharge end of the machine. The screeching of the rolls does not materially affect their operation but is extremely irritating to the workers in the packing house.

An object of my invention is to provide a machine of the type described which will operate in a relatively silent manner.

A further object is the provision of rolls for use in such a machine which are simple and inexpensive to manufacture as well as being noiseless in operation.

Other objects and advantages will become apparent in the following description taken in connection with the accompanying drawings, in which:

Fig. 1 is a side elevational view of a preferred form of the machine of my invention, portions of the machine being broken away in this view to show certain details of construction.

Fig. 2 is an enlarged, fragmentary vertical sectional view taken on the line 2—2 of Fig. 1.

Fig. 3 is a fragmentary, vertical sectional view taken on a plane indicated by the line 3—3 of Fig. 2, the structure shown in Fig. 3 being at the intake end of the machine.

Referring specifically to the drawings, a water eliminator 10, comprising a preferred embodiment of my invention, is shown in Fig. 1. The machine 10 includes a frame 11, transverse rolls 12, roll conditioning units 13, a cleanout mechanism 14, and power transmitting mechanism 15.

The frame 11 includes a pair of angle iron bars 20 and 21 extending longitudinally of the machine 10, the bars 20 and 21 being supported by legs 22. As seen in Fig. 2, side plates 25 are provided at each side of the machine 10, the plates 25 being supported by brackets 26 mounted on the angle bars 20 and 21. Mounted on the angle bar 20 is a series of equally spaced bearings 30 in which roll driving shafts 31 are journalled. Each of the shafts 31 is squared at its inner end as indicated at 32 and is provided with a sprocket 33 fixed on the outer end thereof. Mounted on the angle bar 21 in alignment with the bearings 30 are bearings 35 in which stationary studs 36 are removably fixed. Mounted on the undersides of the angle bars 20 and 21 are hangers 37 for supporting angle bars 38, the latter extending longitudinally of the machine 10.

Supported by the legs 22 below the rolls 12 is a pan 39 for receiving water in a manner described hereinafter.

Each of the rolls 12, as shown in Figs. 2 and 3, includes a cylindrical shell 40 having heads 41 and 42 mounted in opposite ends thereof. The head 41 has a square socket 43 for receiving the squared end 32 of the shaft 31 while the head 42 is bored to receive the inner end of the stud 36.

The interior of each of the shells 40 between the heads 41 and 42 is packed tightly with a vibration-absorbing material 45 such as sawdust or the like.

Each of the roll conditioning units 13 includes a squeegee 50 and a scraper 51, these being supported by members 54 mounted on the angle bars 38 as shown in Fig. 2. Extending through each pair of the squeegees and scrapers 50 and 51 is a plurality of rods 55 carrying springs 56, the latter urging the units 50 and 51 into contact with the rolls 12 and into supported relation with the members 54. Provided for the purpose of periodically cleaning the squeegees 50 are blades 60 carried by bars 61 slidable on the angle bars 38 at each side of the machine 10. As shown in Fig. 3, a transverse shaft 65 is mounted at one end of the machine having levers 66 adapted to engage pins 67 extending from the end of each of the bars 61. The shaft 65 is rotated as described hereinafter by means of a hand lever 69.

The cleanout mechanism 14 includes a pair of shafts 72 and 73 suitably journalled between the side plates 25 of the machine 10 as seen in Fig. 1. Fixed on the shafts 72 and 73 are pairs of sprockets 74 about which endless chains 75 are trained. Carried by the chains 75 are transverse rows of yieldable fingers 76 for the purpose of urging fruit through the machine 10 in a manner familiar in the art.

The power transmitting mechanism 15 includes an endless chain 80 as seen in Fig. 1, positioned to mesh with the lower sides of the sprockets 33 so as to drive the rolls 12 in the direction indicated by the arrows A of Figs. 1 and 3. The chain 80 is driven by a suitable motor M, rotation of the latter being transmitted by means of a belt 85 and gearing 86 to the chain 80.

The cleanout mechanism 14 is driven from the endmost of the rolls 12 by means of a chain 88 and gearing 89 as diagrammatically shown in Fig. 1.

Operation

The water eliminator 10 of my invention, when installed for use in a packing house, is positioned between a washer and a drier as shown in Fig. 1. After being washed, the wet fruit is delivered from the washer by a suitable dropboard 95 onto the uppermost surfaces of the rolls 12. The fruit settles in the valleys formed between adjacent ones of the rolls 12 and is continually rotated between these rolls during which time the excess surface moisture on the fruit is transmitted to the surfaces of the rolls 12. The squeegees 50, urged into wiping relation with the rolls 12 by the springs 56, remove the excess moisture from the surfaces of the rolls to maintain the latter in condition to receive additional moisture from the fruit. The moisture removed from the rolls 12 by the squeegees 50 is received by the pan 39.

The aforementioned plates 60 are provided for the purpose of removing any foreign material that may accumulate on the wiping surfaces of the squeegees 50, as disclosed in my co-pending application above referred to. When it is desirable to clean the squeegees 50 by means of the plates 60, the shaft 65 is rotated counter-clockwise as viewed in Fig. 3 by means of the lever 69. Rotation of the shaft 65 in this direction causes the lever 66 to draw the bars 61 leftward, thus urging the blades 60 between the squeegees 50 and the surfaces of the rolls 12. As the edges of the blades 60 pass between the squeegees 50 and the rolls 12, any foreign material on the squeegees 50 is removed therefrom, thus maintaining the squeegees 50 free from foreign material to enable them to efficiently remove moisture from the surfaces of the rolls 12.

The fruit bodies F are caused to progress from valley to valley throughout the length of the machine 10 by the feeding of additional fruit to the machine 10 and by the action of the cleanout mechanism 14 in a manner familiar in the art.

Obviously, as the fruit progresses from the intake end of the machine 10 to the discharge end thereof, the quantity of surface moisture on the fruit is gradually reduced until the latter is discharged from the machine 10 onto a delivery board 96 and delivered to the drier.

Prior to my invention, eliminators were operated—at least as far as the construction of the cylindrical brass rolls is concerned, and the application of rubber squeegees and scrapers thereto—substantially as above described except that the brass rolls were empty. This caused these rolls to be very resonant and the friction of the rubber squeegees and scrapers against these rolls, particularly at the discharge end of the machine where these rolls were almost dry, set up high frequency vibrations in the rolls which produced a loud and very weird screeching. The packing of these rolls, as above described, with a vibration-preventing material such as sawdust, has a damping effect on the shells of these rolls which prevents the setting up of any sound vibrations therein. Thus, the highly objectionable screeching which was unavoidable prior to my invention has been entirely eliminated from the operation of this type of machine.

While I prefer to pack the interior of the shells 40 solid with a light material such as sawdust, it is to be understood that the vibration-preventing means of my invention may take various forms, such as the application of a layer of vibration-preventing material to the inner surfaces of the shells 40.

I claim as my invention:

A roll for use in combination with a squeegee in a water eliminator, said roll comprising: a cylindrical shell of thin metal; heads extending into opposite ends of said shell; means on said heads for supporting said roll; and a body of sawdust packed tightly within said shell so as to fill the space therein, said sawdust being confined in packed condition in said shell by said heads.

FRED STEBLER.